United States Patent [19]
Jolin

[11] Patent Number: 5,549,067
[45] Date of Patent: Aug. 27, 1996

[54] FLOATABLE LUGGAGE CARRIER FOR PICKUP TRUCKS AND SNOWMOBILES, CONVERTIBLE INTO A CAMPER AND A TRIMARAN

[76] Inventor: Gérald Jolin, 295, 14e Avenue, C.P. 131 Trois-Lacs (Qc), Canada, J1T 3N1

[21] Appl. No.: 501,818

[22] Filed: Jul. 13, 1995

[51] Int. Cl.⁶ .................................................. B63B 1/00
[52] U.S. Cl. ............................. 114/61; 114/344; 114/354
[58] Field of Search ............................. 114/61, 123, 343, 114/344, 352, 353, 354, 77 R; 280/414.1

[56] References Cited

U.S. PATENT DOCUMENTS

| | | |
|---|---|---|
| 3,828,379 | 8/1974 | Walston .................................. 114/344 |
| 3,835,491 | 9/1974 | Aine ....................................... 114/344 |
| 3,940,813 | 3/1976 | Konstantinov et al. ................ 114/344 |
| 4,294,484 | 9/1981 | Robertson . | 
| 4,337,543 | 7/1982 | Van Ulzen . |
| 4,648,649 | 3/1987 | Beal . |
| 5,131,712 | 7/1992 | Heinz . |

FOREIGN PATENT DOCUMENTS

| | | |
|---|---|---|
| 1062090 | 9/1979 | Canada . |
| 1189110 | 6/1985 | Canada . |
| 1194366 | 9/1985 | Canada . |
| 1285431 | 7/1991 | Canada . |
| 1285826 | 7/1991 | Canada . |

*Primary Examiner*—Stephen Avila
*Attorney, Agent, or Firm*—Antoine H. Gauvin

[57] ABSTRACT

A floatable luggage carrier, for pickup trucks and snowmobiles, convertible into a camper and a trimaran, comprises a rectangular floatable main vessel. A rectangular floatable wing vessel is hinged along each of the longitudinal side walls of the main vessel, at the top. The wing vessels turn from a position side-by-side with the main vessel to an upside-down position over the main vessel: where the wing vessels side-by-side may define a trimaran and a camper, and in the upside-down position over the main vessel define a top for a luggage carrier, the luggage carrier being the main vessel, slidable into a loading platform of a pickup truck and usable with a snowmobile.

19 Claims, 7 Drawing Sheets

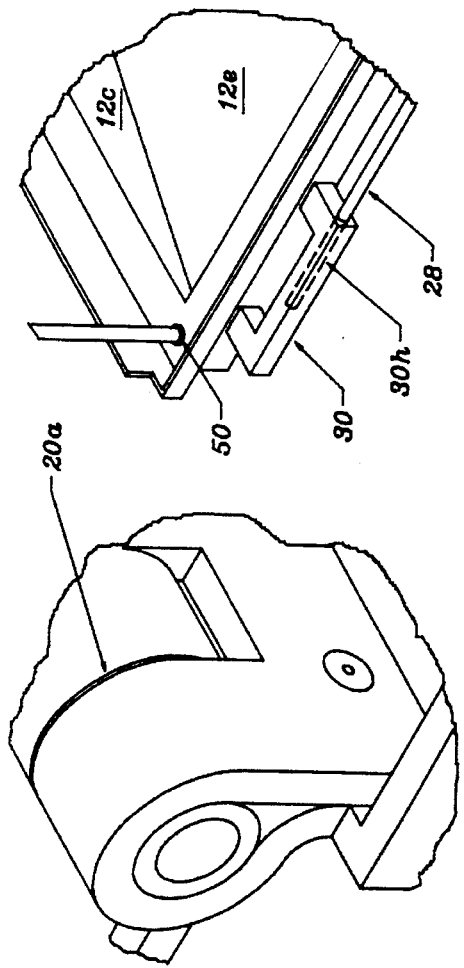
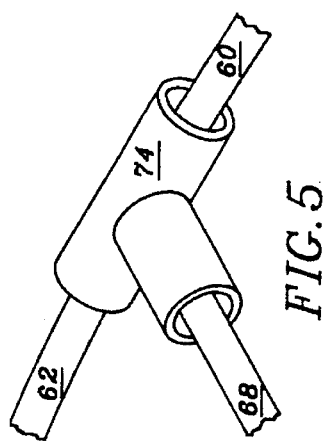
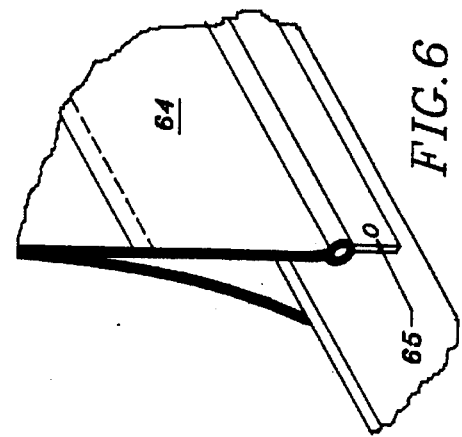
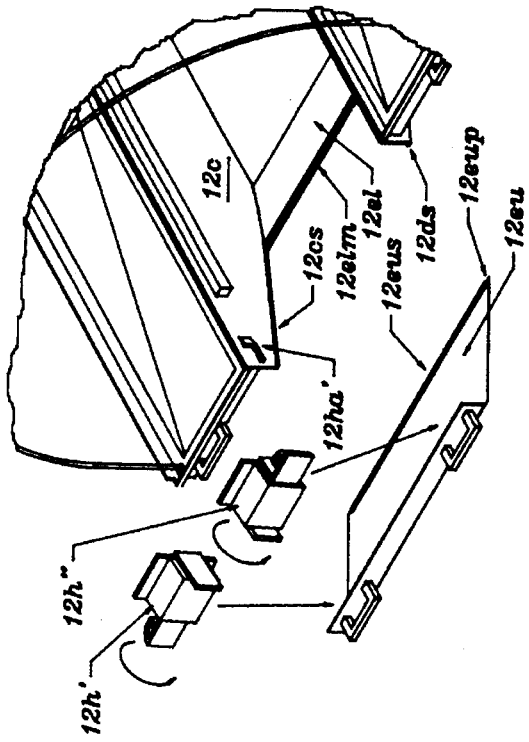

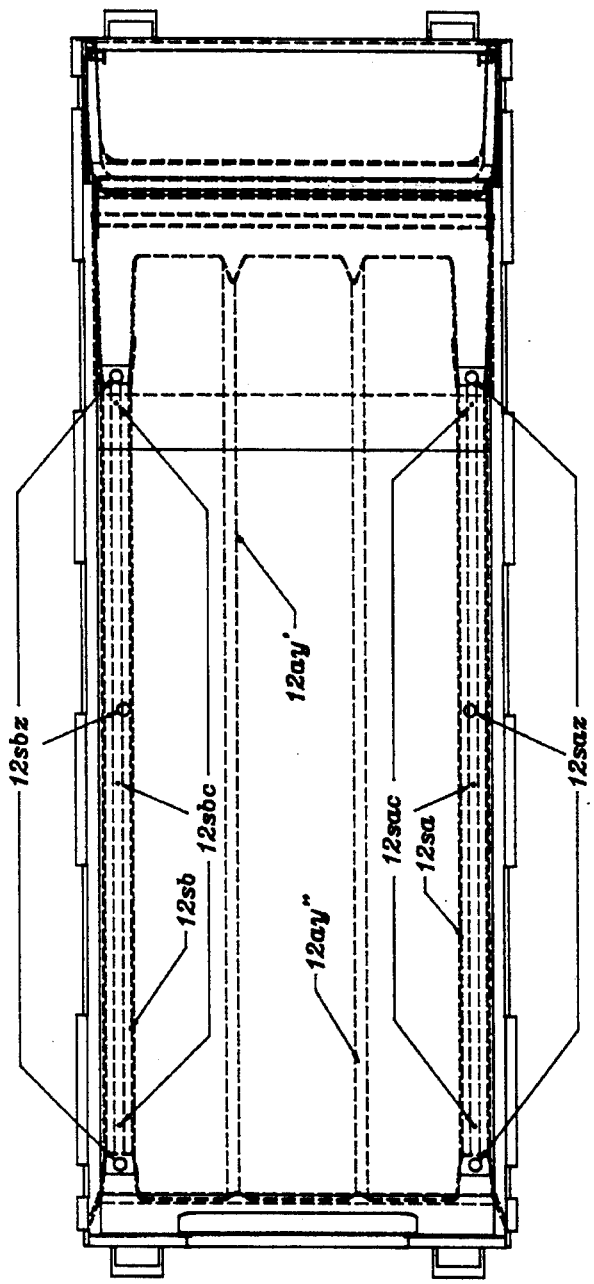
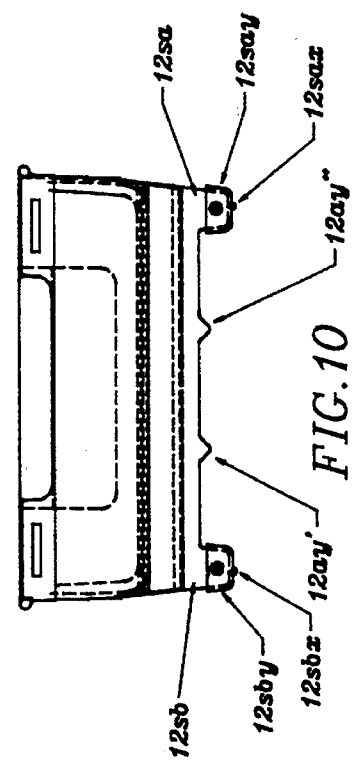
FIG. 9
FIG. 10

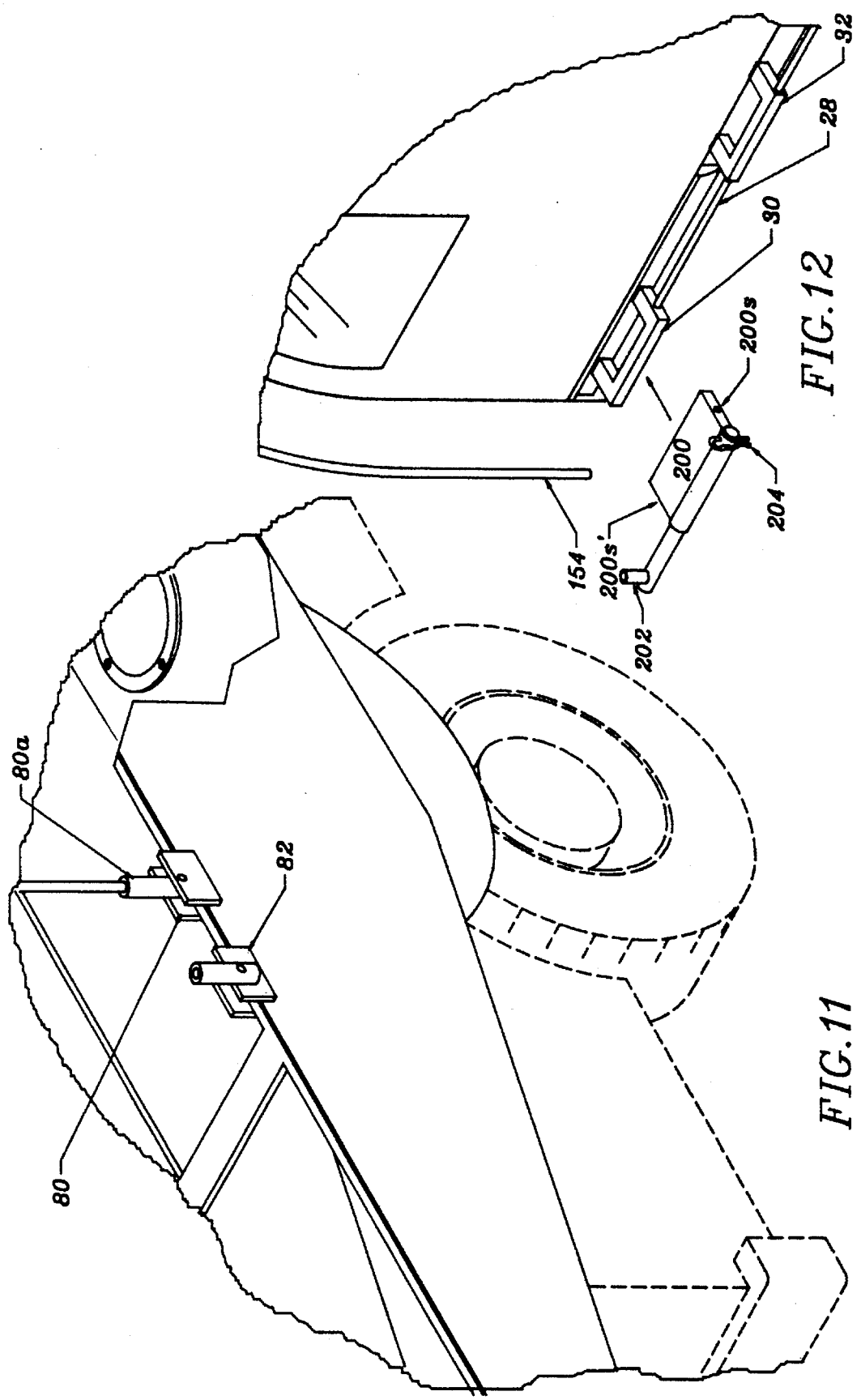

FLOATABLE LUGGAGE CARRIER FOR PICKUP TRUCKS AND SNOWMOBILES, CONVERTIBLE INTO A CAMPER AND A TRIMARAN

BACKGROUND OF THE INVENTION

1. Field of the Invention

This invention relates to a floatable luggage carrier, for pickup trucks and snowmobiles, convertible into a camper and a trimaran. This invention relates more particularly to such multifunctional versatile floatable luggage carriers to be used in wild areas where lakes and islands are present.

2. Description of Related Art

Camper trucks are well known, and have been described for instance, in U.S. Pat. No. 5,131,712 dated Jul. 21, 1992, as invented by Heinz; in U.S. Pat. No. 4,648,649, dated Mar. 10, 1987, as invented by Beal; in U.S. Pat. No. 4,294,484 dated Oct. 13, 1981, as invented by Robertson; and in Canadian Patent 1,189,110 dated Jun. 18, 1985 as invented by Dawes.

Folding boats have been described in Canadian Patent 1,062,090 dated Sep. 11, 1979, as invented by Lalancette; in Canadian Patent 1,194,366 dated Oct. 1, 1985, as invented by Holzbaur; in Canadian Patent 1,285,431 dated Jul. 2, 1991, as invented by Figone and in Canadian Patent 1,285,826 dated Jul. 9, 1991, as invented by Levine. A trimaran has been described in U.S. Pat. No. 4,337,543 dated Jul. 6, 1992, as invented by Van Ulsen.

As far as Applicant is aware, there is no known floatable luggage carriers that are convertible into either a camper or a trimaran.

SUMMARY OF THE INVENTION

The invention aims at providing an instrument which may accomplish all or some of the following:

be used in a pickup truck as a camper;

be closed, with luggage therein, while being driven through bushes such as in northland;

be able to receive an all terrain vehicle therein;

be used as a boat where lakes are present;

be used as a boat to transport an all terrain vehicle;

be mounted in a trailer for snowmobile and pulled with a snowmobile, be pulled with a snowmobile, sliding on snow for distances for example, of 25 miles and more, and in the winter be pulled with a snowmobile, and be used for fishing through ice.

Broadly stated the invention is directed to a floatable luggage carrier, for pickup trucks and snowmobiles, convertible into a camper and a trimaran, comprising:

a substantially rectangular floatable main vessel having:
a flat bottom being substantially horizontal,
a rear wall and opposite longitudinal side walls, upwardly extending from said bottom, and an inclined front wall extending from said bottom and away from said rear wall,
each of said longitudinal side walls, said rear wall, and said inclined front wall of said main vessel, having a top and a bottom,
said tops, from said flat bottom of said main vessel, being of a given height, a substantially rectangular floatable wing vessel hingedly mounted along each of said longitudinal side walls, at the top,
each of said wing vessels having:
a first flat shallow bottom portion being substantially horizontal, and running parallel and adjacent to said longitudinal side walls of said main vessel, and a second flat bottom portion being substantially horizontal, and having a height substantially equal to the given height of the main vessel,
a rear wall and opposite longitudinal side walls, upwardly extending from said second bottom portion, and an inclined front wall extending from said second bottom portion and away from said rear wall,
and a shallow longitudinal side upwardly extending from each of said first flat shallow bottom portions, adjacent to said longitudinal walls of said main vessel,
each of said longitudinal side walls, said rear wall, and said inclined front wall of said wing vessels, having a top and a bottom,
the dimension of each of said wing vessels, as taken from said tops of the rear wall, and of the inclined front wall of said wing vessels, being in length, substantially equal to that of the main vessel,
and across, as taken from the tops of the longitudinal side walls being substantially half that of the main vessel,
said wing vessels being so hingedly mounted as to turn from a position side-by-side with the substantially rectangular floatable main vessel to an upside-down position over said main vessel:
where said wing vessels side-by-side with the main vessel define a trimaran and a camper, with a gap being defined between the shallow longitudinal side upwardly extending from each of said first flat shallow bottom portions, and said longitudinal sides of said main vessel,
and the flat bottom of said main vessel and the second flat bottom portions of said wing vessels being in a substantially same plane, but spaced by one of said first flat shallow bottom portions and said gap,
and said wing vessels in said upside-down position over said main vessel define a top for a luggage carrier, the luggage carrier being said substantially rectangular floatable main vessel, slidable into a loading platform of a pickup truck and usable with a snowmobile,
and means for releasably locking said wing vessels to said substantially rectangular floatable main vessel in said side-by-side position with the substantially rectangular floatable main vessel.

Preferably, the main vessel is provided with at least one brace for pulling the luggage carrier.

In a preferred embodiment, this floatable luggage carrier includes means provided in said wing vessels for mounting poles supporting at least one canvas.

In another preferred embodiment, at least part of the inclined front wall is removably mounted in a water-tight arrangement.

Still in another preferred embodiment, the flat bottom of the main vessel includes at least a pair of skis, and most preferably skis having fins preventing side sliding over the snow and the ice.

Further embodiments of the invention will be described herein below.

DESCRIPTION OF THE DRAWINGS

In the drawings which illustrate some of the preferred ways of carrying out the invention.

FIG. 2 is a view taken along line 2—2 of FIG. 1;

FIG. 4 is an enlarged perspective view of the left handle and surrounding, of FIG. 1;

FIG. 5 is a view taken along line 5—5 of FIG. 1;

FIG. 6 is a view taken along line 6—6 of FIG. 1;

FIG. 7 is a perspective view taken along line 7—7 of FIG. 1, partly exploded of upper front wall, and of further enlarged and 180° turned latches;

FIG. 9 is a bottom view of the main vessel or floatable luggage carrier;

FIG. 10, is a rear elevation view of the main vessel or the lower portion of the floatable luggage carrier;

FIG. 11, is an enlarged side view of one portion of one wing vessel illustrating another means for holding poles;

FIG. 12, is an enlarged partly exploded view, taken along line 12—12 of FIG. 8 illustrating another means to fixedly mount poles;

DESCRIPTION OF SOME OF THE PREFERRED WAYS OF CARRYING OUT THE INVENTION

Figure 1:
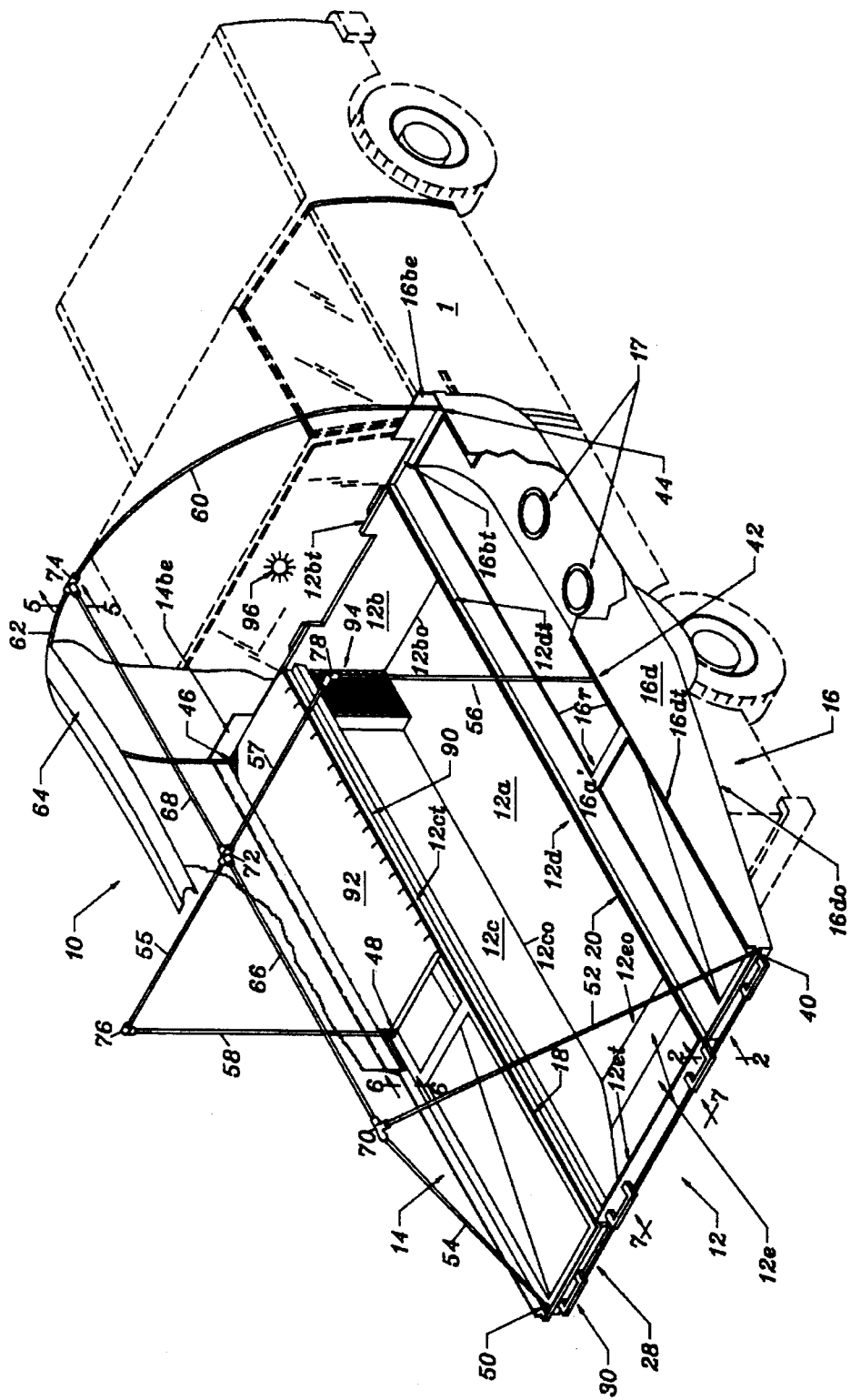
FIG. 1 is a perspective view of a floatable luggage carrier, mounted in a pickup truck, open into a camper.

As shown in FIG. 1, a multifunctional, versatile, floatable luggage carrier 10, for pickup trucks and snowmobiles, convertible into a camper and a trimaran, shown mounted in a pickup truck 1 as a camper, comprises:

a substantially rectangular floatable main vessel 12 having:

a flat bottom 12a being substantially horizontal, a rear wall 12b and opposite longitudinal side walls 12c, 12d, upwardly extending from the bottom 12a, and an inclined front wall 12e extending from the bottom 12a and away from the rear wall 12b. Preferably, this front wall 12e is partly removable, as will be discussed herein below. If desired, and preferably the flat bottom 12a defines or is provided with at least a pair of skis 12sa, 12sb (FIGS. 9 and 10), most preferably with removably mounted fins, preventing side sliding over the snow or the ice and which may also have some stabilizing effect in water. The fins may be a stainless steel rod, such as 12sax and 12sbx, running along the longitudinal axis of each ski, and most preferably such steel rods mounted in or over a highly resistant plastic frame, such as 12say, 12sby, said plastic frames being removably mounted, for instance with screws such as 12saz, 12sbz, or fastened with studs, screws or other fastening means, as shown for instance at 12sac, 12sbc. The bottom of the main vessel is preferably provided with strengthening ribs such as 12ay' and 12ay" (FIGS. 9 and 10).

Each of the longitudinal side walls, the rear wall, and the inclined front wall of the main vessel, have a top and a bottom, such as 12ct, 12dt, 12bt, 12et, and 12co, 12do (FIG. 3), 12bo, 12eo respectively.

Figure 3:
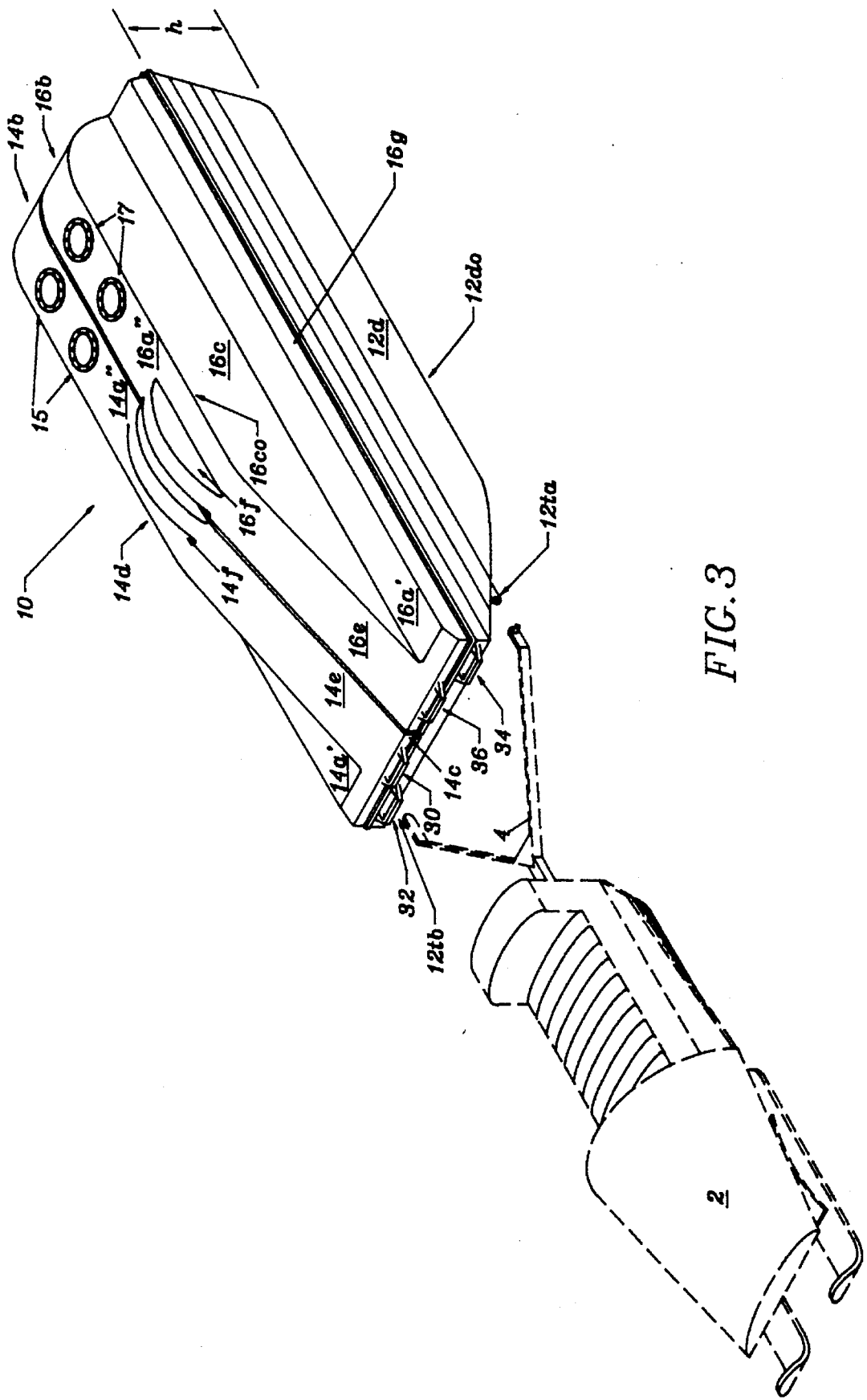
FIG. 3 is a perspective view of the floatable luggage carrier closed, pulled from braces by a snowmobile.

These tops such as 12ct, 12dt, 12bt, 12et, from the flat bottom 12a of the main vessel, are of a given height, for instance "h" (FIG. 3).

Preferably, the main vessel is provided with at least one brace, for pulling the floatable luggage carrier 10 in or out of the platform of a pickup truck, or with a snowmobile: The brace may be a metallic brace running along the front wall of the main vessel, about midpoint from said top and said bottom of said front wall, and ending near the longitudinal side walls, such as 12ta, 12tb, (FIG. 3). Though less preferred, the brace or braces, could be replaced with a rope or a cable, running along the periphery of the main vessel and to that end, conveniently over handles such as 30, 32, 34, 36 which are more fully described further on, providing hook means for positioning the cable or the rope. Instead, though less preferred, a notch or notches or a pair of projection may be used for positioning the cable or the rope.

A substantially rectangular floatable wing vessel, respectively 14 and 16, is hingedly mounted along each of the longitudinal side walls 12c, 12d, at the top, such as 12ct, 12dt: Preferably, the substantially rectangular floatable wing vessels are hingedly mounted along each of the longitudinal side walls, at the top, such as 12ct, with piano hinges 18, 20, so that one of said piano hinges extends on top of, and along, each of said longitudinal side walls of said main vessel, and on top of, and along, each of the corresponding longitudinal side wall of the wing vessel adjacent to the longitudinal side wall of the main vessel.

One of the plurality of knuckle joints of a piano hinge running along the top of the longitudinal side walls 12ct and 12dt, is shown in FIG. 2, at 20a. These piano hinges may be metallically made, or made up with fibre glass or a composite material of sufficient structural strength. If desired, other hinges are also contemplated, for instance ordinary door hinges also called rectangular or square hinges.

The front wall may be fixedly mounted, but preferably the front wall is at least partly removably mounted in a watertight arrangement, in order to ease the entrance of a 4-wheel recreative vehicle: For instance as shown in FIG. 7, the front wall 12e is split into an upper portion 12eu, and a lower portion 12el. That lower portion 12el should end above the flotation line of the catamaran fully loaded, for security sake.

The lower portion at its free end is provided with a mortise 12elm. The upper portion 12eu, at its lower periphery, defines a peg 12eup, engaging said mortise, and the upper portion eu is further provided with a resilient, watertight seal 12eus. The upper portion 12eu is also provided with security sliding latches, such as the first parts 12h' and 12h" to releasably secure that upper portion 12eu of the front wall against the free edges at the bottom of the longitudinal side walls 12co, 12do, of the main vessel, with the second part of the complementary security latches, such as member 12ha', thus providing security latch means.

The longitudinal side walls near their respective free edges, adjacent to the upper portion 12eu, are also provided with water tight seals 12ds, 12cs. thereby completing a matching peripheral water-tight seal of the upper portion 12eu with the main vessel.

As shown in FIG. 3, each wing vessel has:

a first flat shallow bottom portion 14a', 16a', being substantially horizontal, and running parallel and adjacent to the longitudinal side walls 12c, 12d, of the main vessel, and a second flat bottom portion 14a", 16a", being substantially horizontal, and having a height substantially equal to the given height of the main vessel, that is approaching the given height "h" of the main vessel or being equal thereto, a rear wall 14b, 16b and opposite longitudinal side walls, 14c, 14d, 16c, 16d (FIG. 1), upwardly extending from the second bottom portion, and an inclined front wall 14e, 16e, extending from the second bottom portion 14b″, 16a″, and away from the rear wall, 14b, 16b; and a shallow longitudinal side upwardly extending from each of said first flat shallow bottom portions, adjacent to said longitudinal walls of said main vessel, such as 16g. The hinges are so mounted so as to obtain a gap between the longitudinal walls 12c and 12d of the main vessel and their respective adjacent shallow longitudinal sides upwardly extending from each of said first flat shallow bottom portions, when the wing vessels 14, 16 are turned in a position side-by-side with the main vessel. Such gaps are for example of the order of ½, and preferably ¼ inch, for cushioning wave vibrations, when used as a catamaran.

Preferably, the second flat bottom portions 14a″, 16a″ are provided with longitudinal stabilizing ribs or blades 14f, 16f. Also these second bottom portions 14a″, 16a″ or one of these, may be provided with at least one port-hole, for instance port-holes 15 and 17, for fishing through the ice, in water or for connecting a toilet, for examples.

Each of the longitudinal side walls, the rear wall, and the inclined front wall of the wing vessels, have a top such as 16dt, 16bt, (FIG. 1), and a bottom, such as 16do, for instance.

The dimension of each wing vessel, as taken from the tops of the rear wall, and the inclined front wall of said wing vessels, being in length, substantially that of the main vessel, and across, as taken from the tops of the longitudinal side walls being substantially half that of the main vessel, The wings or wing vessels 14, 16 are so hingedly mounted that may turn from a position side-by-side of the substantially rectangular floatable main vessel to an upside-down position over the main vessel:

where the wing vessels side-by-side with the main vessel, define a trimaran and a camper as shown in FIG. 1, with a gap being defined between the shallow longitudinal side upwardly extending from each of the first flat shallow bottom portions, and the longitudinal sides of the main vessel, and the wing vessels in the upside-down position over the main vessel define a top for a luggage carrier as shown in FIG. 3, the luggage carrier being the substantially rectangular floatable main vessel, usable on the platform of a pickup truck as shown in FIG. 1, and by a snowmobile 2 pulling the luggage carrier, as shown in FIG. 3.

Means for releasably locking the wing vessels

Means are provided for releasably locking the wing vessels 14, 16 to the substantially rectangular floatable main vessel in the side-by-side position with the substantially rectangular floatable main vessel:

There are numerous ways to obtain that means for releasably locking the wing vessels. As shown in FIGS. 1, 3 and 4, one of that means consists in U-shaped handles such as 30, having a housing such as 30h, for receiving a positioning rod 28, at least one of the handles being fastened near the top of the front walls of the wing vessels such as 30, 36 and of the main vessel, and preferably two near the top of the front walls of the main vessel, such as 32, 34, (FIG. 3), the positioning rod 28 bridging said handles.

Preferably aside from the handles described above, one of said handles is fastened near the top of the rear walls of the wing vessels, and one on the top of the rear wall of the main vessel and adjacent to each of said wings, and a positioning rod is bridging respectively each one of said handles of the wing vessels with the one of the main vessel that is the closest. This also illustrates that the rod or other means for releasably locking the wing vessels need not extend from one wing to the other.

Instead, of these handles, if desired, eye-bolts or eye-screws, fastened near the top of the front walls of the wing vessels and of the main vessel, are used for receiving the positioning rod 28.

Figure 13:
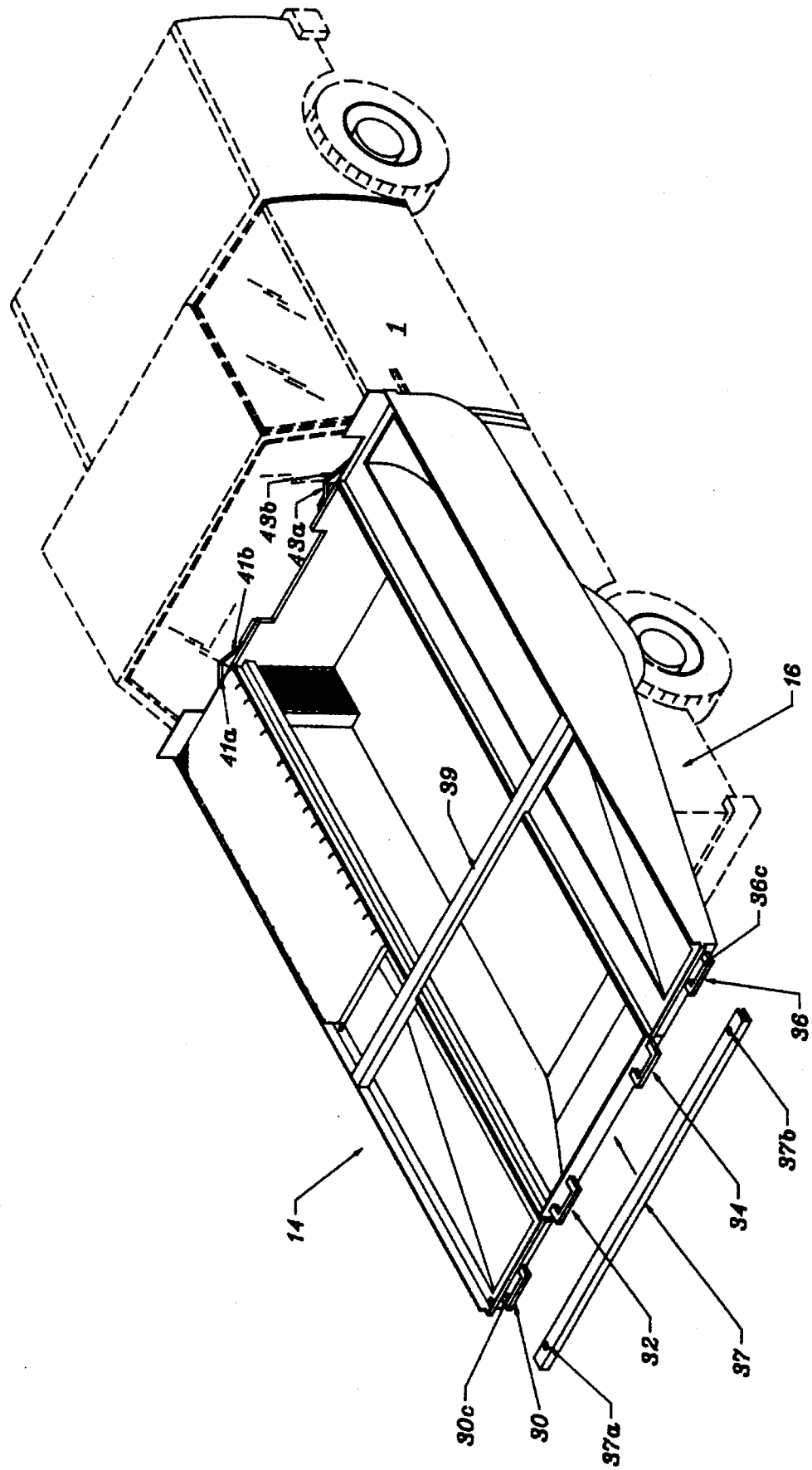
FIG. 13 is a perspective view as in FIG. 1, but illustrating other means of locking the wing vessels in a side-by-side position.

Instead, as shown in FIG. 13, a U-shaped bar or beam 37, having a U-shaped cross-section, and provided with slots 37a, 37b, is slidably mountable over the handles 30. 32, 34, 36. Each slot enables sliding therein of a locking bolt and nut or the slot is threaded for releasably locking a bolt: the shaft of such blots engaging the space defined between the handles 30 and 36 at 32c and 36c.

Instead, as shown in FIG. 13, a beam or plate 39 may simply sit across the two wings 14, 16.

Instead, as shown in FIG. 13, two sets of two arms respectively 41a, 41b and 43a, 43b may be used: the two arms of a set being, at one end of each arm, pivotally mounted about a same pivot holding together said two arms, and at their other respective end one being pivotally mounted to the front or rear wall of the main vessel and of a wing vessel, such that each set of two arms define a straight line slightly before reaching the side-by-side position. Instead of obtaining the straight line before reaching the side-by-side position and preferably, a sleeve slidably mounted over the one end of each arm and of the same pivot holding together the two arms may be provided, for tight fitting and holding together the two arms in the straight line. Instead, and preferably, one of the arms may have along the edge of part of one of its length, a perpendicular projection as to define a L-shaped plate, and the other arm is a plate which move to and fro that perpendicular projection so that when the two plates reach the horizontal position, the perpendicular projection acts as a stopper, preventing any further displacement of the two arms.

The position shown in FIG. 13 represents the two arms of two sets at an angle for illustrative purpose only: however the two arms should be seen horizontal before reaching the side-by-side position, as to pull together the wing vessel and the main vessel.

When the wing vessels are in the side-by-side position with the substantially rectangular floatable main vessel, the floatable luggage carrier defines a catamaran:

the flat bottom 12a of the main vessel and the second flat bottom portions 14a″ and 16a″ of the wing vessels are in a substantially same plane, but spaced by one of said first flat shallow bottom portions 14a′ and 16a′.

That shallow bottom, kills two birds with the same stone:

aside from establishing hydrodynamic properties, reducing the resistance of water against the catamaran, it allows the sides of the platform of a pickup truck, to be between the main vessel and the wing vessels, enlarging to that extent the space available when the floatable luggage carrier mounted in a pickup truck, is converted into a camper.

The inclined front wall of the wing vessels are in a substantially same plane, somewhere about 30°, and preferably the inclined front wall of the main vessel is more steeply inclined, somewhere about 45°, than said inclined front walls of said wing vessels, in order to more easily meet the waves.

Means for releasably mounting poles

Preferably means are provided in said wing vessels for releasably mounting poles over which a canvas is to be placed. For instance, the wing vessels have receiving slots such as 40, 42, 44, 46, 48, 50 for tight fitting the ends of poles. The poles are preferably running each, half the distance across the two wing vessels and the main vessel, such as 52, 54, 55, 56, 57, 58, 60, 62, so that they may be joined with T-joints, such as 70, 74 (FIG. 5); a X-joint, such as 72; or L-joints, such as 76, 78, for receiving longitudinal poles such as 66, 68, also be easily dismantled and easily stored in the floatable luggage carrier.

As shown in FIG. 1, the poles may have a plethora of shapes: for instance arcuated such as 60, 62, or angled to define a triangle such as 52, 54, or a rectangular, such as 55, 56, 57, 58.

The wing vessels may have numerous other ways to provide means in said wing vessels for releasably mounting poles over which a canvas 64, partly shown, is to be placed: For instance, as shown in FIG. 11, a pair of releasably mounted or mountable squeezing jaws 80, 82, having for each pair, a coupling tube 80a, and to be releasably or fixedly mounted along the longitudinal side walls of the wing vessels, for instance 16d may replace each of, or part of said receiving slots 40, 42, 44, 46, 48 and 50. The coupling tube receiving over or within the end of one of said poles. The number of these slots or squeezing jaws can be reduced or increased, as desired, 6 being used for illustrative purpose only.

In a preferred embodiment, the canvas such as 64 ends into a two layers, for instance as shown in FIGS. 1 and 6, to sandwich near their respective top, one of the longitudinal side walls, the rear wall, and the inclined front wall of the wings or wing vessels; and preferably at least the inner layer is provided with a plurality of snap-on, such as 65, or other retaining means.

Figure 8:
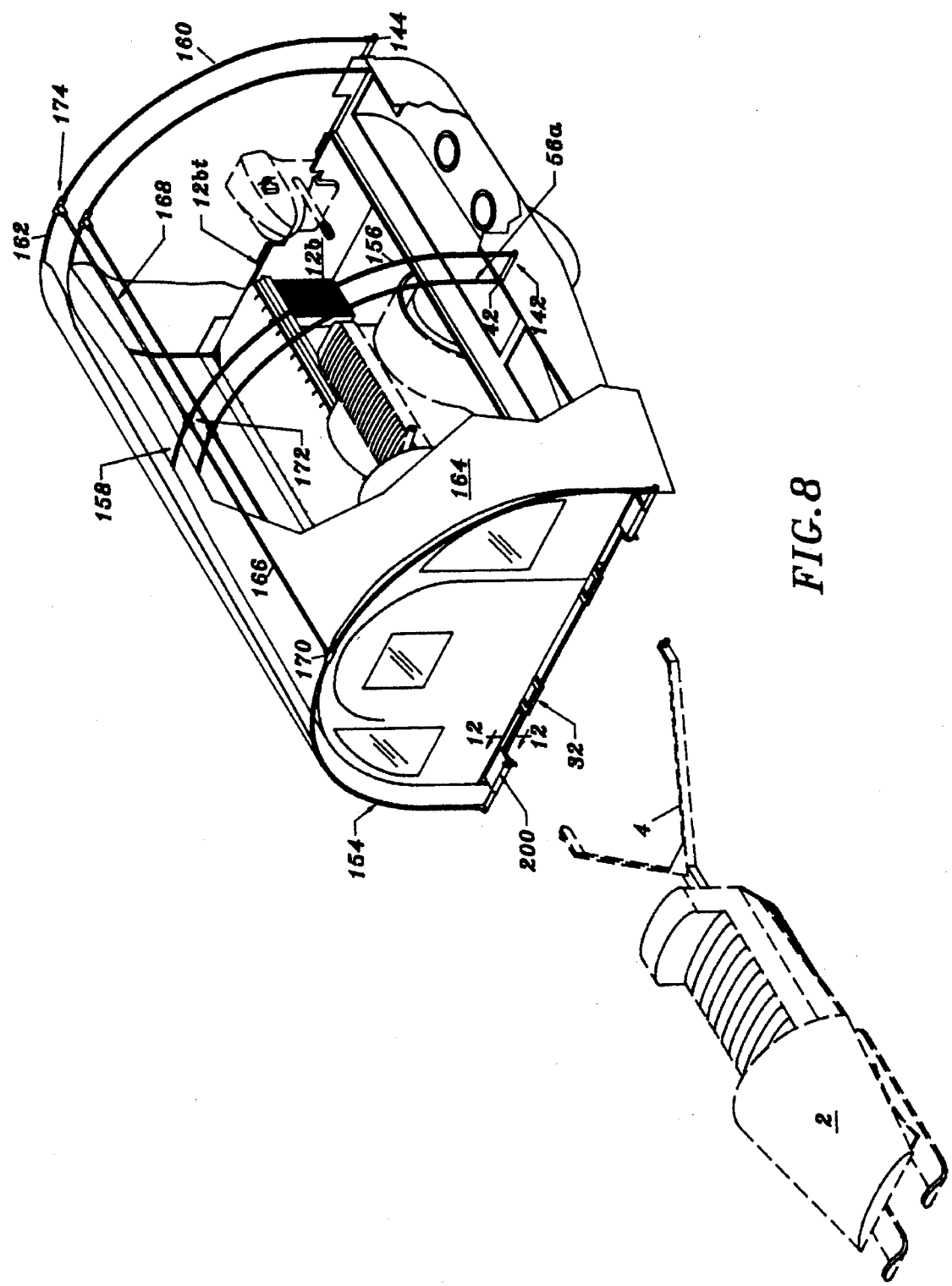
FIG. 8 is a perspective view of the floatable luggage carrier with the snowmobile disconnected, and provided with an outboard motor, and a 4-wheel recreative vehicle.

In a particular embodiment, as shown in FIG. 8, two sets of poles are provided for receiving a second tarpaulin or canvas 164: using as an example spacing plates such as 142, 144, for tight fitting the ends of poles, such as 156, 160, so that such poles may be joined with a T joint, such as 170, 174, or a X joint such as 172, for receiving longitudinal poles such as 166, 168 or L-joints if desired.

Also, as shown in FIGS. 12 and 8, a handle cover 200, housing handle 30, is provided with a coupling 202, for receiving the end of a pole which is positioned at the front or the rear such as 154, 160, 162 and the like. This coupling may be fixably mounted on the handle cover itself provided with a housing for part of the coupling 202 which may be held with lock pin 204, be integral with the handle cover 200 or fixed thereto. The cover is provided with slots 200s and 202s' for receiving therethrough a position rod 28, and thereby simultaneously locking the wing vessels 14, 16, and the handle cover 200.

Instead, of handle covers such as 200, the spacing plates that may be used such as 142, 144, as referred to above, have at both ends, a slot receiving one end of a pole: For instance the end of a pole such as 56a before reaching slots 42, and at the other end of the plate 142, the end of a pole such as 156. These receiving slots such as 142, 144 may be strategically positioned on the sides of the wing vessels, such as on the outside of the longitudinal wall 16d.

In a preferred embodiment, as shown in FIG. 1, the wing vessels define a frame, such as 16r, for receiving a plywood or other flat plate such as 90, over which a foam or air mattress and preferably a life-saving mattress 92, is laid on, to serve as a bed, or as a seat. Other facilities may be incorporated such as a heating unit 94, a removably mounted table, and a light 96.

As shown in FIGS. 3 and 8, the snowmobile 2 which is disconnected, is provided with a pulling bar 4, to be linked to the floatable luggage carrier 10, via metallic brace 12ta, 12tb.

As shown in FIG. 8, the rear wall 12b or transom of the main vessel, has a cut-out top portion, near the top 12bt, for receiving an outboard motor. When the front wall of the main vessel, is removed at least partly, entrance of a 4-wheel recreative vehicle in that floatable luggage carrier 10, is easier. That cut-out top portion may be made up by a corresponding matching projection or extension of the wing vessels 14, 16, such as 14be and 16be, close fitting with said cut-out top portion, for close fitting of the floatable luggage carrier. The wing vessels 14, 16 are acting as buoyancy tubes.

The floatable luggage carrier 10 may be injection extruded, using polyurethane foam and fiberglass coated, and or vinyl polymer coated with reinforcing metallic bars or braces such as 12ta, 12tb, such as for pulling the floatable luggage carrier or be made with composites having the required structural strength.

While some of the preferred embodiments have been described herein above, it is to be understood that the invention is not to be construed as limited to these preferred embodiments, as many modifications and variations are possible within the spirit and scope of the appended claims.

I claim:

1. A floatable luggage carrier, for pickup trucks and snowmobiles, convertible into a camper and a trimaran, comprising:

a substantially rectangular floatable main vessel having:
  a flat bottom being substantially horizontal,
  a rear wall and opposite longitudinal side walls, upwardly extending from said bottom, and an inclined front wall extending from said bottom and away from said rear wall,
  each of said longitudinal side walls, said rear wall, and said inclined front wall of said main vessel, having a top and a bottom,
  said tops, from said flat bottom of said main vessel, being of a given height, a substantially rectangular floatable wing vessel hingedly mounted along each of said longitudinal side walls, at the top, each of said wing vessels having:
  a first flat shallow bottom portion being substantially horizontal, and running parallel and adjacent to said longitudinal side walls of said main vessel, and a second flat bottom portion being substantially horizontal, and having a height substantially equal to the given height of the main vessel, a rear wall and opposite longitudinal side walls, upwardly extending from said second bottom portion, and an inclined front wall extending from said second bottom portion and away from said rear wall, and a shallow longitudinal side upwardly extending from each of said first flat shallow bottom portions, adjacent to said longitudinal walls of said main vessel, each of said longitudinal side walls, said rear wall, and said inclined front wall of said wing vessels, having a top and a bottom, the dimension of each of said wing vessels, as taken from said tops of the rear wall, and the inclined front wall of said wing vessels, being in length, substantially equal to that of the main vessel, and across, as taken from the tops of the longitudinal side walls being substantially half that of the main vessel, said wing vessels being so hingedly mounted as to turn from a position side-by-side with the substantially rectangular floatable main vessel to an upside-down position over said main vessel:

where said wing vessels side-by-side with the main vessel define a trimaran and a camper, with a gap being defined between the shallow longitudinal side upwardly extending from each of said first flat shallow bottom portions, and said longitudinal sides of said main vessel, and the flat bottom of said main vessel and the second flat bottom portions of said wing vessels being in a substantially same plane, but spaced by one of said first flat shallow bottom portions and said gap, and said wing vessels in said upside-down position over said main vessel define a top for a luggage carrier, the luggage carrier being said substantially rectangular floatable main vessel, slidable into a loading platform of a pickup truck and usable with a snowmobile, and means for releasably locking said wing vessels to said substantially rectangular floatable main vessel in said side-by-side position with the substantially rectangular floatable main vessel.

2. The floatable luggage carrier, for pickup trucks and snowmobiles, convertible into a camper and a trimaran, as defined in claim 1, wherein the flat bottom of said main vessel includes at least one pair of skis.

3. The floatable luggage carrier, for pickup trucks and snowmobiles, convertible into a camper and a trimaran, as defined in claim 1, which includes at least one brace for pulling the luggage carrier.

4. The floatable luggage carrier, for pickup trucks and snowmobiles, convertible into a camper and a trimaran, as defined in claim 1, wherein:

said inclined front wall of said wing vessels are in a substantially same plane, and said inclined front wall of said main vessel, is more steeply inclined than said inclined front walls of said wing vessels.

5. The floatable luggage carrier, for pickup trucks and snowmobiles, convertible into a camper and a trimaran, as defined in claim 1, wherein said means for releasably locking said wing vessels to said substantially rectangular floatable main vessel in said side-by-side position with the substantially rectangular floatable main vessel, consists in U-shaped handles having a housing for receiving a positioning rod, at least one of said handles being fastened near the top of the front walls of the wing vessels and of the main vessel, said positioning rod bridging said handles.

6. The floatable luggage carrier, for pickup trucks and snowmobiles, convertible into a camper and a trimaran, as defined in claim 1, wherein said means for releasably locking said wing vessels to said substantially rectangular floatable main vessel in said side-by-side position with the substantially rectangular floatable main vessel, consists in U-shaped handles having a housing for receiving a positioning rod, at least one of said handles being fastened near the top of the front walls of the wing vessels and of the main vessel, and a said positioning rod bridging said handles near the top of the front walls of the wing vessels and of the main vessel, and one of said handles is fastened near the top of the rear walls of the wing vessels, and one on the top of the rear wall of the main vessel and adjacent to each of said wings, and a positioning rod bridging respectively each one of said handles of the wing vessels with the one of the main vessel that is the closest.

7. The floatable luggage carrier, for pickup trucks and snowmobiles, convertible into a camper and a trimaran, as defined in claim 1, wherein said substantially rectangular floatable wing vessels are hingedly mounted along each of said longitudinal side walls, at the top, with piano hinges.

8. The floatable luggage carrier, for pickup trucks and snowmobiles, convertible into a camper and a trimaran, as defined in claim 7, wherein one of said piano hinges extends on top of, and along, each of said longitudinal side walls of said main vessel, and on top of, and along, each of the corresponding longitudinal side wall of the wing vessel adjacent to the longitudinal side wall of the main vessel.

9. The floatable luggage carrier, for pickup trucks and snowmobiles, convertible into a camper and a trimaran, as defined in claim 1, wherein means are provided in said wing vessels for releasably mounting poles supporting at least one canvas.

10. The floatable luggage carrier, for pickup trucks and snowmobiles, convertible into a camper and a trimaran, as defined in claim 9, wherein said means for releasably mounting poles supporting at least one canvas are slots for receiving the ends of said poles, said slots being defined in said wing vessels.

11. The floatable luggage carrier, for pickup trucks and snowmobiles, convertible into a camper and a trimaran, as defined in claim 9, wherein said means for releasably mounting poles supporting at least one canvas are pairs of releasably mountable squeezing jaws, for each pair, one of said jaws having a coupling tube, said jaws to be mounted along the longitudinal side walls of the wing vessels, and said coupling tube receiving one end of one of said poles.

12. The floatable luggage carrier, for pickup trucks and snowmobiles, convertible into a camper and a trimaran, as defined in claim 1, wherein the flat bottom of the main vessel is provided with at least one pair of skis having fins.

13. The floatable luggage carrier, for pickup trucks and snowmobiles, convertible into a camper and a trimaran, as defined in claim 1, wherein at least part of the inclined front wall is removably mounted in a water-tight arrangement, said removably mounted part being above the line of flotation of the floatable luggage carrier fully loaded.

14. The floatable luggage carrier, for pickup trucks and snowmobiles, convertible into a camper and a trimaran, as defined in claim 1, wherein each of said wing vessels define a frame for receiving a mattress.

15. The floatable luggage carrier, for pickup trucks and snowmobiles, convertible into a camper and a trimaran, as defined in claim 1, wherein the rear wall of the main vessel has a cut-out top portion for receiving an outboard motor, and the rear wall of the wing vessels have a corresponding matching projection close fitting with said cut-out portion.

16. The floatable luggage carrier, for pickup trucks and snowmobiles, convertible into a camper and a trimaran, as defined in claim 1, wherein said gap is ¼ inch.

17. The floatable luggage carrier, for pickup trucks and snowmobiles, convertible into a camper and a trimaran, as defined in claim 1, wherein said front wall of said main vessel is at least partly removably mounted in a water-tight arrangement, said longitudinal side walls of the main vessel at their respective bottom thus defining free edges, said front wall of said main vessel being split into an upper portion and a lower portion, said lower portion having an uppermost free end terminating into a mortise, said upper portion having a periphery, said periphery at its lowermost end having a peg, for a water-tight engagement with said mortise of said lower portion, and said upper and lower portions being further provided with a complementary matching peripheral, resilient, water-tight seal, and security latch means to releasably secure that upper portion of the front wall against the free edges at the bottom of said longitudinal side walls of the main vessel.

18. The floatable luggage carrier, for pickup trucks and snowmobiles, convertible into a camper and a trimaran, as defined in claim 1, wherein said second flat bottom portions are provided with a member selected from the group consisting of longitudinal stabilizing ribs and blades.

19. The floatable luggage carrier, for pickup trucks and snowmobiles, convertible into a camper and a trimaran, as defined in claim 1, wherein at least one of said second bottom portions is provided with at least one port-hole.

* * * * *